(12) United States Patent
Weaver et al.

(10) Patent No.: US 7,906,586 B2
(45) Date of Patent: Mar. 15, 2011

(54) THERMOPLASTIC OLEFINIC COMPOSITIONS

(75) Inventors: Laura Bauerle Weaver, Hudson, OH (US); Kim Louis Walton, Lake Jackson, TX (US); Michael Kenneth Laughner, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 11/006,003

(22) Filed: Dec. 7, 2004

(65) Prior Publication Data

US 2005/0176892 A1 Aug. 11, 2005

Related U.S. Application Data

(60) Provisional application No. 60/528,456, filed on Dec. 9, 2003.

(51) Int. Cl.
C08L 23/00 (2006.01)
C08L 23/04 (2006.01)
C08L 23/10 (2006.01)

(52) U.S. Cl. .......... 525/191; 525/232; 525/240

(58) Field of Classification Search .......... 525/191, 525/232, 240
See application file for complete search history.

(56) References Cited

U.S. PATENT DOCUMENTS

| | | | |
|---|---|---|---|
| 2,272,236 A | 2/1942 | Brockhurst | |
| 3,821,143 A | 6/1974 | Cluff et al. | |
| 4,177,160 A | 12/1979 | Cecchin et al. | |
| 4,343,755 A | 8/1982 | Miller et al. | |
| 4,520,260 A * | 5/1985 | Kotian et al. | 219/553 |
| 5,272,236 A | 12/1993 | Lai et al. | |
| 5,278,272 A | 1/1994 | Lai | |
| 5,844,037 A * | 12/1998 | Lundgard et al. | 524/496 |
| 6,278,272 B1 | 8/2001 | Scarzello et al. | |
| 6,300,451 B1 | 10/2001 | Mehta et al. | |
| 6,369,176 B1 | 4/2002 | Laughner | |
| 6,372,847 B1 | 4/2002 | Wouters et al. | |
| 6,486,284 B1 | 11/2002 | Karande et al. | |
| 6,498,214 B2 * | 12/2002 | Laughner et al. | 525/191 |
| 6,506,842 B1 | 1/2003 | Heck et al. | |
| 6,569,915 B1 * | 5/2003 | Jackson et al. | 522/112 |
| 6,774,186 B2 | 8/2004 | Walton | |
| 6,982,311 B2 | 1/2006 | Karande et al. | |
| 7,338,994 B2 | 3/2008 | Walton et al. | |
| 2002/0107328 A1 | 8/2002 | Laughner et al. | |
| 2004/0122190 A1 | 6/2004 | Cady | |
| 2004/0127628 A1 | 7/2004 | Walton et al. | |
| 2005/0009942 A1 | 1/2005 | Walton | |
| 2005/0209403 A1 | 9/2005 | Walton et al. | |
| 2007/0167575 A1 | 7/2007 | Weaver et al. | |
| 2007/0203314 A1 | 8/2007 | Cady et al. | |

FOREIGN PATENT DOCUMENTS

| | | |
|---|---|---|
| CA | 2178459 | 12/1996 |
| EP | 0751182 A1 | 1/1997 |
| EP | 0794226 A1 | 9/1997 |
| WO | WO-98/26000 A | 6/1998 |
| WO | WO-98/32795 | 7/1998 |
| WO | WO-00/26268 A | 5/2000 |
| WO | WO-01/14434 A | 3/2001 |
| WO | WO-03/082971 A | 10/2003 |

OTHER PUBLICATIONS

Doerpinghaus J. Phillip and Beird G. Donald, Separating the effects of sparse long-chain branching on rheology from those due to molecular weight in polyethylenes, The Society of Rheology, Inc., May/Jun. 2003, pp. 717-723, vol. 47(3).
Voluntary Submission of Information dated Jan. 20, 2009 from Solomon Gold to the Commissioner Patents, Ottawa-Gatineau, Canada.
Stretching the Possibilites Novel Ethylene/Butene-Polypropylene Blends for Automotive Thermoformed Sheeting Applications. Weaver et al.; SPAE Automotive Global Conference, Oct. 2004, pp. 1-20.
Cree et al.; Novel Engage-Polypropylene Blends for Automotive Interior Applications, TPO's in Automotive 2004, Nov. 29, 2004, pp. 1-31.
Weaver et al.; Novel Ethylene/Butene-Poypropylene Blends for Automotive Thermoformed Sheeting Applications. SPE TPO Conference 2004, pp. 1-17.
Cree et al., Novel Engage/Polypropylene Blends for Automotive Interior Application, TPOs in Automotive, 2004, Jun. 2-3, 2004, Barcelona Spain, pp. 1-17.
U.S. Appl. No. 60/528,456, pp. 1-24.

* cited by examiner

*Primary Examiner* — Nathan M Nutter

(57) ABSTRACT

Thermoplastic olefinic compositions comprising (a) at least one ethylene/α-olefin polymer having a PRR between 8 and 70 and (b) at least one polypropylene polymer and an (a)/(b) weight ratio of greater than 50/less than 50 to 90/10. The compositions are used in extrusion, calendering, blow molding, foaming and thermoforming processes to make a variety of articles, such as automotive instrument panel skins.

34 Claims, No Drawings

THERMOPLASTIC OLEFINIC COMPOSITIONS

CROSS-REFERENCE TO RELATED APPLICATION

This application claims the benefit of U.S. Provisional Application 60/528,456, filed Dec. 9, 2003, incorporated herein, in its entirety, by reference.

FIELD OF THE INVENTION

This invention relates generally to thermoplastic olefinic compositions that comprise at least one shear sensitive ethylene/alpha ($\alpha$)-olefin (EAO) interpolymer having a density of less than 0.91 g/cc and at least one polypropylene polymer in a weight ratio of EAO to polypropylene that is greater than 50/50, and to the use of such compositions in processes to make articles of manufacture. This invention particularly relates to olefinic compositions wherein the shear sensitive EAO has high levels of T-type long chain branching, a Processing Rheology Ratio (PRR) between 8 and 70, a 0.1 rad/sec (190° C.) shear viscosity of greater than 200,000 and a melt strength of greater than 5, and to the use of such compositions in extrusion, calendering, blow molding, foaming, and thermoforming processes.

BACKGROUND

In U.S. Pat. No. 6,372,847, Wouters discloses thermoplastic olefin elastomers blends (TPO's). As explained by Wouters, "TPO's are multiphase polymer systems where the polypropylene forms a continuous matrix and the elastomers and filler are the dispersed phase." In other words, TPO's comprise a majority amount of polypropylene and a minority amount of elastomers so as to form the desired structure. Wouters' TPO's are blends of a propylene-based polymer and an ethylene/$\alpha$-olefin elastomer having a MLRA/ML ratio of at least 8 and an ethylene content of from about 74 to about 95 mole percent. MLRA/ML is a measure of polymer relaxation that Wouters uses to indicate the amount of long chain branching. Any polymer having a MLRA/MV value of less than three is considered to have an essentially linear structure (column 7 lines 21-22). The patentee asserts that the elastomers with an MLRA/ML ratio of at least 8 are required to provide adequately high levels of long chain branching. The TPO's comprising such elastomers are disclosed as having improved low temperature toughness. Additionally, the long chain branching in the Examples of Wouters was accomplished exclusively by the use of H-type branching agents such as vinylnorbornene, 5-ethylidene-2-norbornene, and norbornadiene and a vanadium catalyst, whereas the long chain branching in the Comparative Examples of Wouters was accomplished by T-type branching.

In WO 00/26268, Cady et al. disclose ethylene/$\alpha$-olefin interpolymers characterized by a PRR of at least 4, an indication that long chain branching is present. An additional aspect of the disclosure is a polymer blend composition comprising said interpolymer and an amount of a crystalline polyolefin resin. The interpolymer is desirably present in an amount of less than 50 parts by weight and the crystalline polyolefin resin is desirably present in an amount of more than 50 parts by weight.

Manufacturers of elastomeric parts continue searching for elastomers with processing characteristics that allow them to attain any or all of higher rates of productivity, improved quality and broader markets, especially for compositions comprising a majority amount of an elastomer. Conventional processes used to make parts with an elastomeric composition component include, without limitation, profile extrusion, film extrusion, sheet extrusion, calendering, blow molding, blown film, and thermoforming processes. There are multiple methods for measuring whether or not a particular polymer or polymer blend will be useful for a particular process and/or part. Some examples of these measuring techniques include melt strength (MS), shear thinning index, zero shear viscosity, molecular weight, molecular weight distribution, creep resistance (hot creep and creep set), degree of long chain branching (LCB), gel content, elongation, and tensile strength. Depending on the particular application, some of these properties are more critical than others. Improvements in some of these properties have a direct affect upon productivity, quality and market breadth relative to such elastomeric parts.

When using a profile extrusion process, a manufacturer usually desires an elastomer that "shear thins" (in other words is shear sensitive) or decreases in viscosity with applied shear forces. Because pressure drop across an extruder die and amperage required to turn an extruder screw are directly related to elastomer viscosity, a reduction in elastomer viscosity due to shear thinning necessarily leads to a lower pressure drop and a lower amperage requirement. The manufacturer can then increase extruder screw speed until reaching a limit imposed by amperage or pressure drop. The increased screw speed translates to an increase in extruder output. An increase in shear thinning also delays onset of surface melt fracture (OSMF), a phenomenon that otherwise limits extruder output. Surface melt fracture is usually considered a quality defect and manufacturers typically limit extruder output and suffer a productivity loss to reach a rate of production that substantially eliminates surface melt fracture.

When producing profile extrusions with thin walls and a complex geometry, a manufacturer looks for an elastomer with high MS and rapid solidification upon cooling in addition to good shear thinning behavior. A combination of a high MS and rapid solidification upon cooling allows a part to be extruded hot and cooled below the elastomer's solidification temperature before gravity and extrusion forces lead to shape distortion. Ultimately, for broad market acceptance, a finished part should also retain its shape despite short term exposure to an elevated temperature during processing, shipping or eventual use.

Manufacturers who prepare elastomeric extruded and blown films and calendered sheets seek the same characteristics as those who use profile extrusion. An improved or increased shear thinning rheology leads to higher production rates before OSMF with its attendant variability in film or sheet thickness. A high MS promotes bubble stability in a blown film operation and provides a wide window of operations for further processing of such films via thermoforming. A high MS also promotes roll release during calendering. Rapid solidification or solidification at a higher temperature keeps an embossed calendering profile from collapsing or being wiped out. As with injection molding, an increase in creep resistance leads to an expansion of potential markets for resulting film and sheets.

Compositions having a high melt strength and creep resistance are desired in calendering and blow molding operations. In many instances, the calender rolls are fed with a composition in the form of a molten rod. This molten composition must be able to spread across the calender rolls. Additionally, after sheet formation, the hot sheet must resist creep or sagging until it cools.

Compositions having a high melt strength and creep resistance are also preferred for thermoforming applications. In addition, tensile properties of the compositions at elevated temperatures are important for these applications. For example, one method of manufacturing instrument panel skin material is to either calender or extrude embossed sheeting. The sheeting is then vacuum thermoformed to the contour of the instrument panel. One method to determine compound thermoformability is by evaluating its elevated stress-strain behavior. Often, flexible polypropylene thermoplastic (TPO) sheets are thermoformed at temperatures below the melting point of the polypropylene phase. Although the thermoforming process is one of biaxial extension, tensile tests at the thermoforming temperatures can be used to compare thermoforming and grain retention behavior. The peaks and valleys of the embossed grain are areas of greater and lesser thickness and a look at the grain shows that the valleys are narrower and less glossy than the peak areas. When a skin is thermoformed, the thinner areas will be subject to greater stress and the greater applied stress in these areas concentrates the elongation in the thinner valley areas. These areas elongate preferentially and the attractive "narrow valley, broad peak" appearance is lost, called "grain washout"—unless the material can be designed to elongate more evenly. Strain hardening is the property by which areas of material which have already been strained become stiffer, transferring subsequent elongation into areas which are as yet unstrained. Strain hardening thus allows a thermoformed skin to exhibit more evenly distributed elongation and minimized grain washout.

Various methods have been used in an attempt to improve the performance characteristics of polymers and polymer blends for these type of applications. One method is rheology modification of TPE compositions as disclosed by Heck et al. in WO 98/32795. The compositions comprise an elastomeric EAO polymer or EAO polymer blend and a high melting polymer. The compositions desirably contain the EAO polymer or EAO polymer blend in an amount of from about 50 to about 90 wt % and the high melting polymer(s) in an amount of from about 50 to about 10 wt %, both percentages being based on composition weight. The preferred elastomeric EAO polymer, before rheology modification, is a substantially linear ethylene polymer having a polymer backbone substituted with 0.01-3 long chain branches per 1000 carbons in the backbone. The rheology modification can be induced by various means including peroxides and radiation. The compositions of Heck et al. are said to exhibit a combination of four properties which make the compositions suited for high temperature processes: shear thinning index (STI) of at least ($\geqq$) 20, melt strength (MS) $\geqq$1.5 times that of the composition without rheology modification, solidification temperature (ST)$\geqq$10° C. greater than that of the composition without rheology modification and upper service temperature (UST) limit $\geqq$10° C. greater than that of the composition without rheology modification. However, while these compositions are useful in high temperature applications such as is used for automotive parts and boot shafts, the rheology modification is an extra step, radiation is expensive and peroxide by-products can leave undesirable residual odors. There remains a need to find cheaper and easier methods to prepare compositions with equivalent or superior performance characteristics for various high temperature applications such as extrusion, calendering, blow molding and thermoforming.

SUMMARY OF THE INVENTION

It has now surprisingly been found that compositions simply comprising a majority amount of certain highly long chain branched EAO polymers having specific characteristics, with a minority amount of various types of polypropylene polymers provide blend compositions having excellent physical properties for use in calendering, extrusion, blow molding, foaming, and thermoforming operations, without the need for peroxides or other rheology modifiers. As such, one aspect of this invention is a thermoplastic olefinic composition comprising at least one EAO interpolymer having high levels of T-type long chain branching, a density less than 0.91 g/cc, a Processing Rheology Ratio (PRR) between 8 and 70, a 0.1 rad/sec viscosity greater than 200,000 and a melt strength of 5 or greater, and at least one polypropylene polymer selected from the group consisting of polypropylene homopolymers and propylene/α-olefin copolymers.

A second aspect of this invention is an article of manufacture comprising at least one component thereof fabricated from the thermoplastic olefinic composition of the first aspect. The compositions readily allow formation of articles of manufacture using apparatus with suitable upper pressure limitations combined with relatively long flow paths and narrow flow channels such as calendering, extrusion, blow molding and/or thermoforming processes.

DETAILED DESCRIPTION OF THE INVENTION

The compositions of the invention comprise at least one EAO interpolymer. "Interpolymer" as used herein refers to a polymer having polymerized therein at least two monomers. It includes, for example, copolymers, terpolymers and tetrapolymers. It particularly includes a polymer prepared by polymerizing ethylene with at least one comonomer, typically an alpha olefin (α-olefin) of 3 to 20 carbon atoms ($C_3$-$C_{20}$). Illustrative α-olefins include propylene, 1-butene, 1-hexene, 4-methyl-1-pentene, 1-heptene, 1-octene, butadiene, and styrene. The α-olefin is desirably a $C_3$-$C_{10}$ α-olefin. Illustrative polymers include ethylene/propylene (EP) copolymers, ethylene/butene (EB) copolymers, ethylene/octene (EO) copolymers, gethylene/alpha-olefin/diene modified (EAODM) interpolymers such as ethylene/propylene/diene modified (EPDM) interpolymers and ethylene/propylene/octene terpolymers. Preferred copolymers include EP, EB, ethylene/hexene-1 (EH) and EO polymers.

The EAO interpolymers of this invention are highly long chain branched compared to current commercially available EAO polymers. The ability to incorporate LCB into polymer backbones has been known and practiced for many years. In U.S. Pat. No. 3,821,143, a 1,4-hexadiene was used as a branching monomer to prepare ethylene/propylene/diene (EPDM) polymers having LCB. Such branching agents are sometimes referred to as H branching agents. U.S. Pat. Nos. 6,300,451 and 6,372,847 also use various H type branching agents to prepare polymers having LCB. In U.S. Pat. No. 6,278,272 it was discovered that constrained geometry catalysts (CGC) have the ability to incorporate vinyl terminated macromonomers into the polymer backbone to form LCB polymers. Such branching is referred to as T type branching.

The '272 patent teaches such CGC are unique in their ability to incorporate large unsaturated molecules into a polymer backbone. The amount of LCB that can be incorporated by these CGC is from 0.01 LCB/1000 carbon atoms to 3 LCB/1000 carbon atoms. There are various other methods that can be used to define the degree of LCB in a molecule. One such method is taught in U.S. Pat. No. 6,372,847. This method uses Mooney stress relaxation data to calculate a MLRA/ML ratio. MLRA is the Mooney Relaxation Area and ML is the Mooney viscosity of the polymer. Another method is PRR, which uses interpolymer viscosities to calculate the levels of LCB in a polymer.

Interpolymer viscosity is conveniently measured in poise (dyne-second/square centimeter (d-sec/cm$^2$)) at shear rates within a range of 0.1-100 radian per second (rad/sec) and at 190° C. under a nitrogen atmosphere using a dynamic mechanical spectrometer (such as a RMS-800 or ARES from Rheometrics) under dynamic sweep made from 0.1 to 100 rad/sec. The viscosities at 0.1 rad/sec and 100 rad/sec may be represented, respectively, as $V_{0.1}$ and $V_{100}$ with a ratio of the two referred to as RR and expressed as $V_{0.1}/V_{100}$. PRR is calculated by the formula:

$$PRR=RR+[[3.82-\text{interpolymer Mooney Viscosity} \\ (ML_{1+4} \text{ at } 125° \text{ C.})]\times 0.3]$$

The EAO interpolymers of this invention have a PRR between 8 and 70, preferably between 12 and 60, more preferably between 15 and 55 and most preferably between 18 and 50. Current commercial EAO resins having normal levels of LCB typically have PRR values less than 3. A PRR of 70 is equivalent to an MLRA/MV value of 7.6.

The type of LCB in the interpolymers of this invention is T-type branching as opposed to H-type branching. T-type branching is typically obtained by copolymerization of ethylene or other alpha olefins with chain end unsaturated macromonomers in the presence of a metallocene catalyst under the appropriate reactor conditions such as those described in WO 00/26268. If extremely high levels of LCB are desired, H-type branching is the preferred method since T-type branching has a practical upper limit to the degree of LCB. As discussed in WO 00/26268, as the level of T-type branching increases, the efficiency or throughput of the manufacturing process decreases significantly until the point is reached where production becomes economically unviable. T-type LCB polymers can be easily produced by metallocene catalysts without measurable gels but with very high levels of T-type LCB. Because the macromonomer being incorporated into the growing polymer chain has only one reactive unsaturation site, the resulting polymer only contains side chains of varying lengths and at different intervals along the polymer backbone.

H-type branching is typically obtained by copolymerization of ethylene or other alpha olefins with a diene having two double bonds reactive with a nonmetallocene type of catalyst in the polymerization process. As the name implies, the diene attaches one polymer molecule to another polymer molecule through the diene bridge, the resulting polymer molecule resembling an H which might be described as more of a crosslink than a long chain branch. H-type branching is typically used when extremely high levels of branching are desired. If too much diene is used, the polymer molecule can form so much branching or crosslinking that the polymer molecule is no longer soluble in the reaction solvent (in a solution process) and falls out of solution resulting in the formation of gel particles in the polymer. Additionally, use of H-type branching agents may deactivate metallocene catalysts and reduce catalyst efficiency. Thus, when H-type branching agents are used, the catalysts used are typically not metallocene catalysts. The catalysts used to prepare the H-type branched polymers in U.S. Pat. No. 6,372,847 are vanadium type catalysts.

Lai et al. claim T-type LCB polymers in U.S. Pat. No. 2,272,236 in which the degree of LCB is from 0.01 LCB/1000 carbon atoms to 3 LCB/1000 carbon atoms and the catalyst is a metallocene catalyst. According to P. Doerpinghaus and D. Baird in the Journal of Rheology, 47(3), pp 717-736 May/June 2003, "Separating the Effects of Sparse Long-Chain Branching on Rheology from Those Due to Molecular Weight in Polyethylenes", free radical processes such as those used to prepare low density polyethylene (LDPE) produce polymers having extremely high levels of LCB. For example, the resin NA952 in Table I of Doerpinghaus and Baird is a LDPE prepared by a free radical process and, according to Table II, contains 3.9 LCB/1000 carbon atoms. Ethylene alpha olefins (ethylene-octene copolymers) commercially available from The Dow Chemical Company (Midland, Mich., USA) that are considered to have average levels of LCB, resins Affinity PL1880 and Affinity PL1840 of Tables I and II, respectively contain 0.018 and 0.057 LCB/1000 carbon atoms.

The EAO component of the compositions of this invention has T-type LCB levels greatly exceeding that of current, commercially available EAOs but LCB levels below that obtainable by using H-type and free radical branching agents. Table I lists the LCB levels of various types of polymers. EAOs that are a component of the invention are designated numerically (e.g., EAO-1), comparative EAOs are designated alphabetically (e.g., EAO-A). The LCB in EAO-G through EAO-J is H-type, the LCB in all other listed EAOs is T-type.

TABLE I

| EAO | Mooney Viscosity | MLRA/MV | PRR | Comonomer | EAO Product Name |
| --- | --- | --- | --- | --- | --- |
| EAO-A | 26.2 | 0.3 | −2.9 | butene | ENR 7270.00 |
| EAO-B | 48.6 | 1.2 | −5.5 | butene | ENX 7380.00 |
| EAO-C | 21.5 | 0.8 | 0.6 | octene | Engage ® 8100 |
| EAO-D | 34.4 | 1.2 | −0.8 | octene | Engage ® 8150 |
| EAO-E | 34.1 | 1.2 | −0.5 | octene | Engage ® 8180 |
| EAO-F | 18.3 | 0.6 | −0.5 | butene | experimental |
| EAO-1 | 40.1 | 3.8 | 29 | butene | ENX 7086.00 |
| EAO-2 | 27 | 2.8 | 22 | butene | ENR 7086.01 |
| EAO-3 | 36.8 | 2.4 | 15 | butene | experimental |
| EAO-4 | 17.8 | 2.3 | 12 | butene | experimental |
| EAO-5 | 15.7 | 2.0 | 10 | butene | experimental |
| EAO-6 | 37.1 | 7.6 | 70 | propylene | experimental |
| EAO-7 | 17.4 | 3.4 | 26 | 69.5 wt % ethylene/ 30 wt % propylene/ 0.5% ENB | Nordel ® IP 3722 |
| EAO-G | 24.5 | 10.9 | | 76.8 wt % ethylene/ 22.3 wt % propylene/ 0.9% ENB | Vistalon 1703 |

TABLE I-continued

| EAO | Mooney Viscosity | MLRA/MV | PRR | Comonomer | EAO Product Name |
|---|---|---|---|---|---|
| EAO-H | 27 | 7.1 | 72 | 72 wt % ethylene/ 22 wt % propylene/ 6% hexadiene | Nordel ® 2722 |
| EAO-I | 50.4 | 7.1 | | 71 wt % ethylene/ 23 wt % propylene/ 6% hexadiene | Nordel ® 2744 |
| EAO-J | 62.6 | 8.1 | 55 | 71 wt % ethylene/ 23 wt % propylene/ 6% hexadiene | Nordel ® 2760 |

The Engage ®, ENR, ENX, Nordel ® and Nordel ® IP products were from DuPont Dow Elastomers LLC (Wilmington, DE). Vistalon was a product from ExxonMobil Chemical Company (Houston, TX).

The EAO interpolymers of this invention also have a 0.1 rad/sec. shear viscosity (also referred to herein as low shear viscosity) greater than 200,000, preferably greater than 300,000, more preferably greater than 400,000 and most preferably greater than 450,000. It is obtained by measuring the polymer viscosity at a shear rate of 0.1 radian per second (rad/sec) at 190° C. under a nitrogen atmosphere using a dynamic mechanical spectrometer such as an RMS-800 or ARES from Rheometrics.

Low shear viscosity is affected by a polymer's molecular weight (MW) and the degree of LCB. MW is indirectly measured by melt strength. As a general rule, the greater the MW of a polymer, the better the melt strength. However, when molecular weight becomes too great, the polymers become impossible to process. Incorporation of LCB into a polymer backbone improves the processability of high MW polymers. Thus, low shear viscosity (0.1 rad/sec) is somewhat of a measure of the balance of MW and LCB in a polymer.

The EAO interpolymers of the invention have a melt strength of 5 or greater, preferably 6 or greater and more preferably 7 or greater. Melt strength (MS), as used herein, is a maximum tensile force, in centiNewtons (cN), measured on a molten filament of a polymer melt extruded from a capillary rheometer die at a constant shear rate of 33 reciprocal seconds (sec−1) while the filament is being stretched by a pair of nip rollers that are accelerating the filament at a rate of 0.24 centimeters per second per second (cm/sec$^2$) from an initial speed of 1 cm/sec. The molten filament is preferably generated by heating 10 grams (g) of a polymer that is packed into a barrel of an Instron capillary rheometer, equilibrating the polymer at 190° C. for five minutes (min) and then extruding the polymer at a piston speed of 2.54 cm/min through a capillary die with a diameter of 0.21 cm and a length of 4.19 cm. The tensile force is preferably measured with a Goettfert Rheotens that is located so that the nip rollers are 10 cm directly below a point at which the filament exits the capillary die.

Preferably, the EAO interpolymers of the invention have a molecular weight distribution (MWD) of 1.5 to 4.5, more preferably 1.8 to 3.8 and most preferably 2.0 to 3.4.

EAO interpolymers suitable for the invention can be made by the process described in WO 00/26268, which is incorporated herein.

The polypropylene polymer component of the compositions of this invention is a homopolymer of propylene, a copolymer of propylene with at least one α-olefin, or a blend of a homopolymer and a copolymer or a nucleated homopolymer, a nucleated copolymer or a nucleated blend of a homopolymer and a copolymer. The α-olefin in the propylene copolymer is preferably ethylene, 1-butene, 1-hexene or 4-methyl-1-pentene, with ethylene being more preferred. The α-olefin in the propylene copolymer is preferably ethylene.

The copolymer may be a random copolymer or a block copolymer or a blend of a random copolymer and a block copolymer. The polymers may also be branched. As such, this component is preferably selected from the group consisting of polypropylene homopolymers and propylene/ethylene copolymers or mixtures thereof. This component desirably has a melt flow rate (MFR) (230° C. and 2.16 kg weight) of 0.1 to 150, preferably 0.3 to 60 g/10 min, more preferably 0.8 to 40 g/10 min and most preferably 0.8 to 25 g/10 min. This component also desirably has a melting point greater than 145° C.

As used herein, "nucleated" refers to a polymer that has been modified by addition of a nucleating agent such as Millad®, a dibenzyl sorbitol commercially available from Milliken. Other conventional nucleating agents may also be used.

Preparation of the polypropylene polymer can involve the use of Ziegler catalysts such as a titanium trichloride in combination with aluminum diethylmonochloride, as described by Cecchin, U.S. Pat. No. 4,177,160. Polymerization processes used to produce such high melting polymers include the slurry process, which is run at about 50-90° C. and 0.5-1.5 MPa (5-15 atm), and both the gas-phase and liquid-monomer processes in which extra care must be given to the removal of amorphous polymer. An α-olefin copolymer may be added to the reaction to form a block copolymer. The polypopylene polymer may also be prepared by using any of a variety of metallocene, single site and constrained geometry catalysts together with their associated processes.

The compositions of this invention comprise at least one EAO interpolymer and at least one polypropylene polymer. The EAO interpolymer(s) is present in an amount of from greater than about 50 to about 90 wt % and the polypropylene polymer(s) in an amount of from less than about 50 to about 10 wt %, both percentages being based on the combined weight of the EAO interpolymer(s) and the polypropylene polymer(s). The amounts are preferably from about 60 to about 90 wt % EAO and from about 40 to about 10 wt % polypropylene polymer, more preferably from about 65 to about 85 wt % EAO and from about 35 to about 15 wt % polypropylene polymer. The amounts are chosen to total 100 wt %. If the EAO concentration is below about 50 wt %, the physical property effects of the polypropylene polymer start to become dominant (the polypropylene polymer becomes the continuous phase) and such compositions are disadvantageous for calendering, extrusion, foaming, blow molding or thermoforming operations because the flexural modulus of the material is inadequate.

Compositions of the invention possess properties advantageous for high temperature processes such as calendaring, extrusion, foaming, blow molding and thermoforming. These properties include a shear thinning index (STI) at 190°

C.≧20, and two of three following heat related characteristics: an upper service temperature (UST) 2-115° C., preferably ≧118° C., a hot creep value (creep resistance) less than 100% at 120° C., preferably less than 50%, and a stress strain slope at 140° C.≧0.20. Further, the compositions of the invention possess a flexural modulus less than 35,000 psi (241.3 Mpa), preferably less than 30,000.

STI, as used herein, is a ratio of polymer viscosity at a specified low shear rate divided by polymer viscosity at a specified high shear rate. For ethylene/alpha-olefin (EAO) polymers, a conventional STI test temperature is 190° centigrade (° C.). Polymer viscosity is conveniently measured in poise (dyne-second/square centimeter (cm 2)) at shear rates within a range of from 0.1 radian per second (rad/sec) to 100 rad/sec and at 190° C. under a nitrogen atmosphere using a dynamic mechanical spectrometer such as an RMS-800 or ARES from Rheometrics.

Flexural Modulus, as used herein, was determined using ASTM D-790 from compression molded sheet samples to obtain the thickness necessary for the test.

UST, as used herein, is that temperature (° C.) at which a thermomechanical analyzer (TMA) penetration probe penetrates a specimen having a thickness of two to three millimeters (mm) to a depth of 900 micrometers (µm). A suitable TMA is produced by TA Instruments, Inc. A one Newton (N) force is applied to the penetration probe as it rests on a surface of the specimen that is in a chamber where temperature is ramped at a rate of 5° C./min.

Creep resistance is defined by determining the hot creep and creep set of the polymer at 8.7 psi. Hot creep is determined by suspending 116 gram weight at the bottom of a standard ASTM D412 tensile bar (1 inch long, 3 mm thick, 6.35 mm wide), which gives 8.7 pounds per square inch force, then placing the weighted bar in an oven at 120° C. for 15 minutes and measuring the hot creep length of the bar at the end of the 15 minutes. Hot creep elongation is calculated by the formula:

% elongation=((hot creep length−original length)/original length)×100

After the final length is measured, the weights are removed from the bar, which is then allowed to equilibrate for 1 hour at 23° C. and the creep set length of the bar is measured to determine Creep set. The amount of elongation observed during the hot creep test that recovers after the 1-hour period is the creep set, which is calculated by the formula:

% creep set=((creep set length−original length)/original length)×100

Stress Strain Slope (SSS), as used herein, indicates elevated temperature tensile properties. SSS is determined by first measuring the engineering stress-strain. To do this, samples cut in the sheeting machine direction from an ISO 37 T2 die were measured in a tensile tester fitted with an environmental chamber heated to 140° C. Samples were equilibrated for ten minutes prior to testing. Samples were strained at 500 mm/min with an initial gauge length of 20 mm. An optical laser measured the strain rate at 0.45 sec$^{-1}$.

The engineering stress-strain from the test was converted to true stress-strain using the Considère equation:

$$\sigma_T = \sigma(1+\epsilon)$$

where:
$\sigma_T$=true stress
$\sigma$=engineering stress
$\epsilon$=draw ratio=(L−Li)/Li where:
L=sample length under deformation
Li=initial sample length The true stress-strain data was plotted from a draw ratio range of 0.25 to 2. A least squares linear regression was performed on the data. The equation determined was of the form:

$$\sigma_T = a\epsilon + b$$

where:
a=slope of the line (slope of strain hardening)
b=y intercept of the line The slope, a, was determined from the data using the following least squares method:

$$a = SS_{xy}/SS_{xx}$$

where:

$$SS_{xx} = \sum_{i=1}^{n} (\varepsilon_i - \epsilon)^2$$

$$SS_{xy} = \sum_{i=1}^{n} (\varepsilon_i - \epsilon)(\sigma_i - \bar{\sigma})$$

where:

$\varepsilon_i$ = extension value of individual data points
$\epsilon$ = mean extention value
$\sigma_i$ = true stress value of individual data points
$\bar{\sigma}$ = average true stress value Particularly preferred compositions of this invention comprise 70 wt % to more than 50 wt. % EAO and 30 wt % to less than 50 wt % polypropylene polymer and have a hot creep value (creep resistance) less than 100% at 120° C. More preferably, the compositions have an STI at 190° C.≧20 and an UST≧115° C.

The compositions of the invention can be prepared by combining the EAO polymer(s) with the polypropylene(s). While such compositions can be prepared by any one of a number of different processes, generally these processes fall into one of two categories, i.e., post-reactor blending and in-reactor blending. Illustrative of the former are melt extruders into which two or more solid polymers are fed and physically mixed into a substantially homogeneous composition, and multiple solution, slurry or gas-phase reactors arranged in a parallel array the output from each blended with one another to form a substantially homogeneous composition which is ultimately recovered in solid form. Illustrative of the latter are multiple reactors connected in series, and single reactors charged with two or more catalysts.

In addition to the EAO and polypropylene polymer, the compositions of the invention advantageously may further comprise at least one additive of the type conventionally added to polymers or polymer compositions. These additives include, for example, process oils, antioxidants, surface tension modifiers, anti-block agents, dispersants, blowing agents, linear or substantially linear EAOs, LDPE, LLDPE, lubricants, crosslinking agents such as peroxides, antimicrobial agents such as organometallics, isothiazolones, organosulfurs and mercaptans; antioxidants such as phenolics, secondary amines, phophites and thioesters; antistatic agents such as quaternary ammonium compounds, amines, and ethoxylated, propoxylated or glycerol compounds; fillers and reinforcing agents such as wollastonite, carbon black, glass, metal carbonates such as calcium carbonate, metal sulfates such as calcium sulfate, talc, clay or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxyphenylbenzotriazole, a 2-hydroxy, 4-alkoxyenzophenone, a salicylate, a cynoacrylate, a nickel chelate and a benzylidene malonate and oxalanilide; and zeolites, molecular sieves and other known deodorizers. A preferred hindered phenolic antioxidant is Irganox® 1076 antioxidant, available from Ciba-Geigy Corp. Skilled artisans can readily select any suitable combination of additives and additive amounts as well as the method of incorporating the additive(s) into the composition without undue experimentation. Typically, each of the above additives, if used, does not exceed 45 wt %, based on total composition weight, and are advantageously from about 0.001 to about 20 wt %, preferably from about 0.01 to about 15 wt % and more preferably from about 0.1 to about 10 wt %. Compounds containing such additive(s) that are prepared from the EAO/polyolefin polymer compositions of this invention possess processing advantages over compounds prepared from the same polymers but with EAOs which do not have the combination of PRR, melt strength and low shear viscosity that are a hallmark of this invention.

Process oils, which are often used to reduce any one or more of viscosity, hardness, modulus and cost of a composition, are a preferred additive. The most common process oils have particular ASTM designations depending upon whether they are classified as paraffinic, naphthenic or aromatic oils. An artisan skilled in the processing of elastomers in general will recognize which type of oil will be most beneficial. The process oils, when used, are desirably present in an amount within a range of from about 5 to about 50 wt %, based on total composition weight.

The compositions of this invention are preferably gel free but could be further modified by peroxides to introduce gels in various amounts depending on the end use application if so desired. In order to detect the presence of, and where desirable, quantify insoluble gels in a polymer composition of this invention, simply soak the composition in a suitable solvent such as refluxing xylene for 12 hours as described in ASTM D 2765-90, method B. Any insoluble portion of the composition is then isolated, dried and weighed, making suitable corrections based upon knowledge of the composition. For example, the weight of non-polymeric components that are soluble in the solvent is subtracted from the initial weight and the weight of non-polymeric components that are insoluble in the solvent is subtracted from both the initial and final weight. The insoluble polymer recovered is reported as percent gel (% gel) content. For purposes of this invention, "substantially gel-free" means preferably less than about 0.5% and most preferably below detectable limits when using xylene as the solvent.

The compositions of this invention can be fabricated into parts, sheets or other article of manufacture using any conventional extrusion, calendering, blow molding, foaming or thermoforming process. The components of the composition can be fed to the process either pre-mixed or, in a preferred embodiment, the components can be fed directly into the process equipment, such as a converting extruder, such that the composition is formed in the extruding, calendering, blow molding, foaming or thermoforming process. The compositions also may be blended with another polymer prior to fabrication of an article. Such blending may occur by any of a variety of conventional techniques, one of which is dry blending of pellets of the TPE composition with pellets of another polymer.

In order to be useful for calendering, extrusion, blow molding, foaming, and thermoforming operations the EAO/polypropylene polymer compositions of this invention must use EAO interpolymers having a specific combination of properties. A specific PRR or degree of LCB alone is not sufficient to achieve the properties required for this invention. Likewise, an EAO interpolymer having a specific melt strength or low shear viscosity is not sufficient to achieve the properties required for this invention. It is the combination of PRR, melt strength, and low shear viscosity, that give superior physical properties, such as creep resistance, to the compositions of this invention.

The rheological behavior of compositions comprising EAO and polypropylene polymers in which the EAO has the inventive combination of properties and comprises greater than at least 50 wt % of the EAO/polypropylene polymer blend shows surprising and useful features. These EAO interpolymers have a low shear viscosity that is larger than a linear polymer of the same molecular weight. They show a rapid drop in viscosity with shear rate (large degree of shear thinning), excellent melt strength that is related to both molecular weight and degree of LCB. The degree of LCB is defined by the PRR. These polymers preferably have no measurable gels. The advantageous impact of these properties is that the compositions of the invention have a very low viscosity for their molecular weights under melt processing conditions and so process much more easily than the prior art polymers while exhibiting increased extensional viscosity indicative of increased melt strength.

A partial, far from exhaustive, listing of articles that can be fabricated from the compositions of the invention includes automobile body parts such as instrument panels, instrument panel skins, instrument panel foam, bumper fascia, body side moldings, interior pillars, exterior trim, interior trim, weather stripping, air dams, air ducts, and wheel covers, and non-automotive applications such as polymer films, polymer sheets, foams, tubing, fibers, coatings, trash cans, storage or packaging containers, lawn furniture strips or webbing, lawn mower, garden hose, and other garden appliance parts, refrigerator gaskets, recreational vehicle parts, golf cart parts, utility cart parts, toys and water craft parts. The compositions can also be used in roofing applications such as roofing membranes. The compositions can further be used in fabricating components of footwear such as a shaft for a boot, particularly an industrial work boot. A skilled artisan can readily augment this list without undue experimentation.

The following examples illustrate but do not, either explicitly or by implication, limit the present invention. Unless otherwise stated, all parts and percentages are by weight, on a total weight basis. Examples of the present invention are identified by Arabic numerals and comparative examples are represented by letters of the alphabet.

EXAMPLES

The following EAO polymers were used in the Examples and Comparative Examples:

EAO-1 was ENX 7086.00 (as listed in Table 1) having the properties listed in Table 2.

EAO-2-1 was ENR 7086.01 (like EAO-2 of Table 1) having the properties listed in Table 2.

Kraton G-1650 was a styrene-ethylene-butylene-styrene (SEBS) block copolymer from Kraton Polymers (Houston, Tex.).

Table 3 shows the compositions for the Examples and Comparative Examples. The AX-71 and Irganox B-225 were added by weight based on PP and elastomer total weight. All other materials were added to total 100 wt %.

TABLE 3

| Component | Comp. Ex. A | Comp. Ex. B | Comp. Ex. C | Comp. Ex. D | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| EAO-1 | | | | | 70 | | | | | | | | |
| EAO-2-1 | 100 | 40 | | | | 70 | 60 | | | | | | |
| EAO-B-A | | | 70 | | | | | | | | | | 15 |
| EAO-E-A | | | | 70 | | | | | | | | | |
| EAO-8 | | | | | | | | 70 | 60 | | | | 45 |
| EAO-9 | | | | | | | | | | 70 | | | |
| EAO-7-1 | | | | | | | | | | | 70 | 60 | |
| SEBS | | | | | | | 10 | | | | | | |
| PP-1 | | 60 | 30 | 30 | | 30 | | 30 | 40 | 30 | 30 | 40 | 40 |
| PP-2 | | | | | 30 | | 30 | | | | | | |
| AX-71 | 0.3 | 0.3 | 0.3 | 0.3 | 0.3 | 0.3 | 0.3 | 0.3 | 0.3 | 0.3 | 0.3 | 0.3 | 0.3 |
| Irganox | 0.1 | 0.1 | 0.1 | 0.1 | 0.1 | 0.1 | 0.1 | 0.1 | 0.1 | 0.1 | 0.1 | 0.1 | 0.1 |

EAO-7-1 was Nordel® IP 3722 (like EAO-7 of Table 1) having the properties listed in Table 2.

EAO-8 was an ethylene-propylene copolymerhaving the properties listed in Table 2.

EAO-9 was an ethylene-octene copolymer having the properties listed in Table 2.

EAO-B-A was ENR 7380 (like EAO-B of Table 1) having the properties listed in Table 2.

EAO-E-A was Engage® 8180 polyolefin elastomer (like EAO-E of Table 1) having the properties listed in Table 2.

TABLE 2

| Polymer | Density | Mooney Viscosity | Wt % Ethylene | Co-monomer | PRR |
|---|---|---|---|---|---|
| EAO-1 | 0.90 | 40 | 87 | Butene | 29 |
| EAO-2-1 | 0.90 | 26 | 87 | Butene | 19 |
| EAO-8 | 0.87 | 26 | 70 | Propylene | 45 |
| EAO-9 | 0.88 | 30 | 70 | Octene | 17 |
| EAO-7-1 | 0.87 | 20 | 69.5 | Propylene/diene | 21 |
| EAO-B-A | 0.87 | 48 | 70 | Butene | 1 |
| EAO-E-A | 0.86 | 32 | 58 | Octene | 0 |

EAO-1, EAO-2-1, EAO-8 and EAO-9 were prepared by the procedure described in WO 00/26268 using a mixed catalyst system described in U.S. Pat. No. 6,369,176.
EAO-7-1 was prepared in dual reactors by the procedure described in WO 00/26268.
EAO-B-A and EAO-E-A were prepared as described in U.S. Pat. Nos. 5,272,236 and 5,278,272.

The following polypropylene polymers were used in the Examples and Comparative Examples:

PP-1 was Profax SR-256M, a clarified polypropylene copolymer resin with a density of 0.90 and a MFR of 2 g/10 min., available from Basell (Elkton, Md.).

PP-2 was Profax 8623, an impact polypropylene copolymer resin with a density of 0.90 and a MFR of 1.5 g/10 min., available from Basell (Elkton, Md.).

The following additional materials were used in the Examples and Comparative Examples:

Irganox B225 was a phenolic based anti-oxidant from Ciba Specialty Chemicals (Terrytown, N.Y.).

AX-71 was a mold release compound from Amfine Chemical Corporation (Allendale, N.J.).

The polymers and additives listed in Table 3 were all added at the same time to a Banbury mixer which had been preheated to 250 F. After all the ingredients were added, the mixer was rotated at 110 rpm until the temperature reached about 300 to 320 F (approximately 3 minutes) at which time the mixer was stopped and the contents dropped and sent to a heated roll mill for stripping into 50.8 mm wide strips for feeding a David Standard single screw extruder. The extruder was used to feed a calendaring roll. Extruder and calendaring conditions are shown in Tables 4, 4A, 5 and 5A. The temperature and speed ranges shown for the extruder zones and calendar rolls were the minimum and maximum temperatures for the various runs. The resulting calendered sheets were tested and the results shown in Table 6.

Shore A hardness was measured in accordance with American Society of Testing and Materials (ASTM) test D-2240.

TABLE 4

Extruder Conditions for Feeding Calender when PP-1 Used

| Zone | Temp. Range ° C. |
|---|---|
| Zone 1, ° C. | 152-160 |
| Zone 2, ° C. | 152-183 |
| Zone 3, ° C. | 152-183 |
| Zone 4, ° C. | 152-182 |
| Speed, rpm | 26-32 |

TABLE 4A

Extruder Conditions for Feeding Calender when PP-2 Used

| Zone | Temp. Range ° C. |
|---|---|
| Zone 1, ° C. | 160-178 |
| Zone 2, ° C. | 182-197 |
| Zone 3, ° C. | 182-199 |
| Zone 4, ° C. | 182-197 |
| Speed, rpm | 13-21 |

TABLE 5

Calender Conditions When PP-1 Used

| Roll | Roll Temp. ° C. |
|---|---|
| Top roll 1 | 166-167 |
| Top roll 2 | 166-167 |
| Mid roll 3 | 154-160 |
| Botton roll 4 | 143-149 |
| Speed, m/min | 0.60-1.22 |

TABLE 5A

Calender Conditions When PP-2 Used

| Roll | Roll Temp. ° C. |
|---|---|
| Top roll 1 | 157-166 |
| Top roll 2 | 157-166 |
| Mid roll 3 | 141-163 |
| Botton roll 4 | 129-152 |
| Speed, m/min | 1.22-1.53 |

TABLE 6

| Property | Comp. Ex. A | Comp. Ex. B | Comp. Ex. C | Comp. Ex. D | Ex. 1 | Ex. 2 | Ex. 3 |
|---|---|---|---|---|---|---|---|
| Flexural Modulus (psi) | 8335 | 59038 | 4088 | 2412 | 23700 | 18912 | 10848 |
| Shore A | 90 | 96 | 79 | 75 | 93 | 91 | 91 |
| SSS (140° C.) | melts | 0.566 | 0.16 | 0.19 | 0.22 | 0.28 | 0.25 |
| UST | 75 | 149 | 114 | 80 | 134 | 124 | 118 |
| Hot Creep Elongation | fail | 0 | fail | 6.25 | 6.25 | 6.25 | 6.25 |
| STI | 25 | 17.7 | 13.9 | 9.6 | 34.5 | 21.3 | 25.6 |

| Property | Ex. 4 | Ex. 5 | Ex. 6 | Ex. 7 | Ex. 8 | Ex. 9 |
|---|---|---|---|---|---|---|
| Flexural Modulus (psi) | 8861 | 17551 | 8348 | 4039 | 17589 | 17420 |
| Shore A | 83 | 91 | 85 | 74 | 89 | 84 |
| SSS (140° C.) | 0.33 | 0.48 | 0.26 | 0.29 | 0.39 | 0.58 |
| UST | 138 | 136 | 128 | 118 | 143 | 137 |
| Hot Creep Elongation | 0 | 0 | 6.25 | 0 | 0 | 0 |
| STI | 43.8 | 33.4 | 21.8 | 27.4 | 24.9 | 29.6 |

Comparative Example A shows that a highly branched EAO, unblended with polypropylene polymers, does not meet the physical property requirements of the invention. The polymer failed the hot creep test and melted during the stress strain test.

Comparative Example B shows that the EAO content of the blends of this invention must be at least 50 wt %. When the EAO is present at less than 50 wt %, the flex modulus is too high and the material does not sufficiently shear thin.

Comparative Examples C and D show that the use of EAOs with very little long chain branching (as shown by the PRR values), even when used at the appropriate blend ratios with PP, have inferior melt related physical properties and inferior processing properties as indicated by the STI results when compared to blend compositions of the invention.

Examples 1-6 of the invention show the advantages of using EAOs having high levels of LCB for the blend compositions. These blend compositions are extremely useful in applications such as extrusion, calendaring, blow molding, foaming, and thermoforming processes. Example 3 and 9 shows that small amounts of other polymers may be added to the composition as long as the ratio of highly branched EAO to PP is greater than 50%.

Examples 7 and 8 show that EAO interpolymers containing dienes and having high levels of LCB, can also be used to prepare the blend compositions of the invention.

What is claimed is:

1. A thermoplastic composition comprising the following:
   at least one ethylene/alpha-olefin interpolymer having a PRR between about 8 and 70, a melt strength of at least 5 cN, a density less than 0.91 g/cc, and a "0.1 radian per second, at 190° C., viscosity" of at least 200,000 poise; and
   at least one polypropylene polymer selected from the group consisting of polypropylene homopolymers and propylene/alpha-olefin interpolymers, and wherein the weight ratio of ethylene/alpha-olefin interpolymer to polypropylene polymer in the composition being from "greater than 50: less than 50" to 90:10, and
   wherein the thermoplastic composition comprises a "190° C. shear thinning index (STI)" of 20 or more, and two of the three following heat related characteristics:
   a) a 140° C. stress strain slope of 0.20 or more;
   b) an upper service temperature (UST) of 115° C. or more; and
   c) a 120° C. hot creep elongation at 8.7 psi of less than 100%; and
   wherein the ethylene/alpha-olefin interpolymer has T-type long chain branching.

2. The composition of claim 1, wherein the ethylene/alpha-olefin interpolymer is an ethylene/alpha-olefin copolymer.

3. The composition of claim 2, wherein the ethylene/α-olefin copolymer has a PRR greater than 12.

4. The composition of claim 2, wherein the ethylene/α-olefin copolymer has a PRR greater than 15.

5. The composition of claim 2, wherein the ethylene/α-olefin copolymer has a PRR greater than 18.

6. The composition of claim 2, wherein the polypropylene polymer has a melting point greater than 145° C.

7. The composition of claim 6, wherein the thermoplastic composition has creep resistance of less than 100% at 120° C.

8. The composition of claim 2, wherein the ethylene/α-olefin copolymer was polymerized by at least one metallocene catalyst.

9. The composition of claim 2, further comprising up to 20% of at least one elastomer containing a branching agent.

10. The composition of claim 2, further comprising up to 20% of at least one elastomeric polypropylene homopolymer or copolymer.

11. The composition of claim 2, wherein at least one polypropylene polymer is a nucleated polymer.

12. The composition of claim 2, wherein at least one polypropylene polymer is a branched polymer.

13. The composition of claim 2, having a 120° C. hot creep elongation @ 8.7 psi of less than 50%.

14. An article of manufacture, comprising at least one component or part formed from the Composition of claim 1.

15. The article of claim 14, wherein the article is made by a blow molding process.

16. The article of claim 14, wherein the article is a blown film.

17. The article of claim 14, wherein the article is made by a calendering process.

18. The article of claim 14, wherein the article is a thermoformed article.

19. The article of claim 18, wherein the article is an automotive interior part.

20. The article of claim 19, wherein the article is an instrument panel skin.

21. The article of claim 19, wherein the article is a door panel skin.

22. The article of claim 19, wherein the article is seat trim.

23. The article of claim 14, wherein the article is made by an extrusion process.

24. The article of claim 17 or claim 23, wherein the article is a vacuum formed profile.

25. The article of claim 24, wherein the article is a refrigerator gasket.

26. The composition of claim 1, wherein the weight ratio of ethylene/alpha-olefin interpolymer to polypropylene polymer is from 60:40 to 90:10.

27. The composition of claim 1, wherein the alpha-olefin is a C3-C10 alpha-olefin.

28. The composition of claim 2, wherein the ethylene/alpha-olefin copolymer is selected from an ethylene/propylene copolymer, an ethylene/1-butene copolymer, an ethylene/1-hexene copolymer, or an ethylene/1-octene copolymer.

29. The composition of claim 28, wherein the ethylene/alpha-olefin copolymer is selected from an ethylene/1-butene copolymer, or an ethylene/1-octene copolymer.

30. An article of manufacture comprising at least one component or part formed from the composition of claim 2.

31. A thermoplastic composition comprising the following:
   at least one ethylene/alpha-olefin copolymer, selected from ethylene/propylene copolymers, ethylene/butene copolymers, ethylene/hexene copolymers or ethylene/octene copolymers, and having a PRR between about 8 and 70, a melt strength of at least 5 cN, a density less than 0.91 g/cc, and a "0.1 radian per second, at 190° C., viscosity" of at least 200,000 poise; and
   at least one polypropylene polymer selected from the group consisting of polypropylene homopolymers and propylene/alpha-olefin interpolymers, and wherein the weight ratio of ethylene/alpha-olefin copolymer to polypropylene polymer in the composition being from "greater than 50:less than 50" to 90:10, and
wherein the thermoplastic composition comprises a "190° C. shear thinning index (STI)" of 20 or more, and two of the three following heat related characteristics:
a) a 140° C. stress strain slope of 0.20 or more;
b) an upper service temperature (UST) of 115° C. or more; and
c) a 120° C. hot creep elongation at 8.7 psi of less than 100%, and
wherein the ethylene/alpha-olefin copolymer has T-type long chain branching.

32. The composition of claim 31, wherein the ethylene/alpha-olefin copolymer is selected from ethylene/1-butene copolymers, or ethylene/1-octene copolymers.

33. A thermoplastic composition comprising the following:
   at least one ethylene/alpha-olefin copolymer consisting of the following monomers: ethylene and an alpha-olefin; and wherein the ethylene/alpha-olefin copolymer has a PRR between about 8 and 70, a melt strength of at least 5 cN, a density less than 0.91 g/cc, and a "0.1 radian per second, at 190° C., viscosity" of at least 200,000 poise; and
   at least one polypropylene polymer selected from the group consisting of polypropylene homopolymers and propylene/alpha-olefin interpolymers, and wherein the weight ratio of ethylene/alpha-olefin copolymer to polypropylene polymer in the composition being from "greater than 50:less than 50" to 90:10, and
wherein the thermoplastic composition comprises a "190° C. shear thinning index (STI)" of 20 or more, and two of the three following heat related characteristics:
a) a 140° C. stress strain slope of 0.20 or more;
b) an upper service temperature (UST) of 115° C. or more; and
c) a 120° C. hot creep elongation at 8.7 psi of less than 100%, and
wherein the ethylene/alpha-olefin copolymer has T-type long chain branching.

34. The composition of claim 33, wherein the ethylene/alpha-olefin copolymer is selected from ethylene/1-butene copolymers, or ethylene/1-octene copolymers.

* * * * *